US012080269B2

(12) United States Patent
Diriye et al.

(10) Patent No.: US 12,080,269 B2
(45) **Date of Patent: *Sep. 3, 2024**

(54) SYNTHETIC SPEECH PROCESSING

(71) Applicant: Amazon Technologies, Inc., Seattle, WA (US)

(72) Inventors: Abdigani Mohamed Diriye, Nairobi (KE); Jaime Lorenzo Trueba, Cambridge (GB); Patryk Golebiowski, Cambridge (GB); Piotr Jozwiak, Gdańsk (PL)

(73) Assignee: Amazon Technologies, Inc., Seattle, WA (US)

(*) Notice: Subject to any disclaimer, the term of this patent is extended or adjusted under 35 U.S.C. 154(b) by 67 days.

This patent is subject to a terminal disclaimer.

(21) Appl. No.: 17/740,680

(22) Filed: May 10, 2022

(65) Prior Publication Data

US 2023/0018972 A1 Jan. 19, 2023

Related U.S. Application Data

(63) Continuation of application No. 17/026,661, filed on Sep. 21, 2020, now Pat. No. 11,341,953.

(51) Int. Cl.

| | |
|---|---|
| ***G10L 13/00*** | (2006.01) |
| ***G10L 13/033*** | (2013.01) |
| ***G10L 13/047*** | (2013.01) |
| ***G10L 13/08*** | (2013.01) |
| ***G10L 15/22*** | (2006.01) |
| ***G10L 21/0232*** | (2013.01) |

(52) U.S. Cl.

CPC .......... *G10L 13/047* (2013.01); *G10L 13/033* (2013.01); *G10L 21/0232* (2013.01)

(58) Field of Classification Search

CPC .......... G10L 13/00; G10L 13/08; G10L 15/22

See application file for complete search history.

(56) References Cited

U.S. PATENT DOCUMENTS

| | | | | |
|---|---|---|---|---|
| 8,818,430 B1 * | 8/2014 | Pulugurta | H04W 4/14 | 455/464 |
| 11,341,953 B2 * | 5/2022 | Diriye | G10L 21/0232 | |
| 2004/0133794 A1 * | 7/2004 | Kocher | G06F 21/62 | 713/193 |

(Continued)

FOREIGN PATENT DOCUMENTS

| | | | |
|---|---|---|---|
| WO | WO-2016048579 A1 * | 3/2016 | G06K 9/00315 |
| WO | WO-2018009397 A1 * | 1/2018 | G10L 15/22 |

OTHER PUBLICATIONS

International Preliminary Report on Patentability issued Mar. 30, 2023 for International Application No. PCT/US2021/049354.

(Continued)

*Primary Examiner* — Shreyans A Patel

(74) *Attorney, Agent, or Firm* — Pierce Atwood LLP

(57) ABSTRACT

A speech-processing system receives input data corresponding to one or more characteristics of speech. The system determines parameters representing the characteristics and, using the parameters, encoded values corresponding to the characteristics. A speech synthesis component of the speech-processing processes the encoded values to determine audio data including a representation of the speech and corresponding to the characteristics.

24 Claims, 15 Drawing Sheets

(56) References Cited

U.S. PATENT DOCUMENTS

| | | | | |
|---|---|---|---|---|
| 2006/0095265 | A1* | 5/2006 | Chu | G10L 13/033 704/E13.004 |
| 2010/0217600 | A1* | 8/2010 | Lobzakov | G10L 13/00 704/260 |
| 2012/0230516 | A1* | 9/2012 | Wong | H03G 3/10 386/E9.011 |
| 2014/0129228 | A1* | 5/2014 | Lai | G10L 13/00 704/260 |
| 2015/0058019 | A1* | 2/2015 | Chen | G10L 13/08 704/260 |
| 2016/0156771 | A1* | 6/2016 | Lee | H04M 1/724 455/414.1 |
| 2020/0082807 | A1 | 3/2020 | Taesu et al. | |
| 2020/0234693 | A1* | 7/2020 | Sung | G10L 15/22 |

OTHER PUBLICATIONS

Tits, et al., "ICE-Talk: an Interace for a Controllable Expressive Talking Machine", arXiv preprint arXiv:2008.11045 (2020).

* cited by examiner

SYNTHETIC SPEECH PROCESSING

CROSS-REFERENCED TO RELATED APPLICATIONS

This application is a continuation of, and claims the benefit of priority to, U.S. application Ser. No. 17/026,661, filed Sep. 21, 2020, entitled "SYNTHETIC SPEECH PROCESSING", which is scheduled to issue as U.S. Pat. No. 11,341,953, the entire contents of which are incorporated herein by reference.

BACKGROUND

A speech-processing system includes a speech-synthesis component for processing input data such as text and/or audio data to determine output data that includes a representation of speech. The speech corresponds to one or more characteristics, such as tone, pitch, or frequency. The speech-synthesis component processes different characteristics to produce different speech.

BRIEF DESCRIPTION OF DRAWINGS

For a more complete understanding of the present disclosure, reference is now made to the following description taken in conjunction with the accompanying drawings.

DETAILED DESCRIPTION

Figure 1:
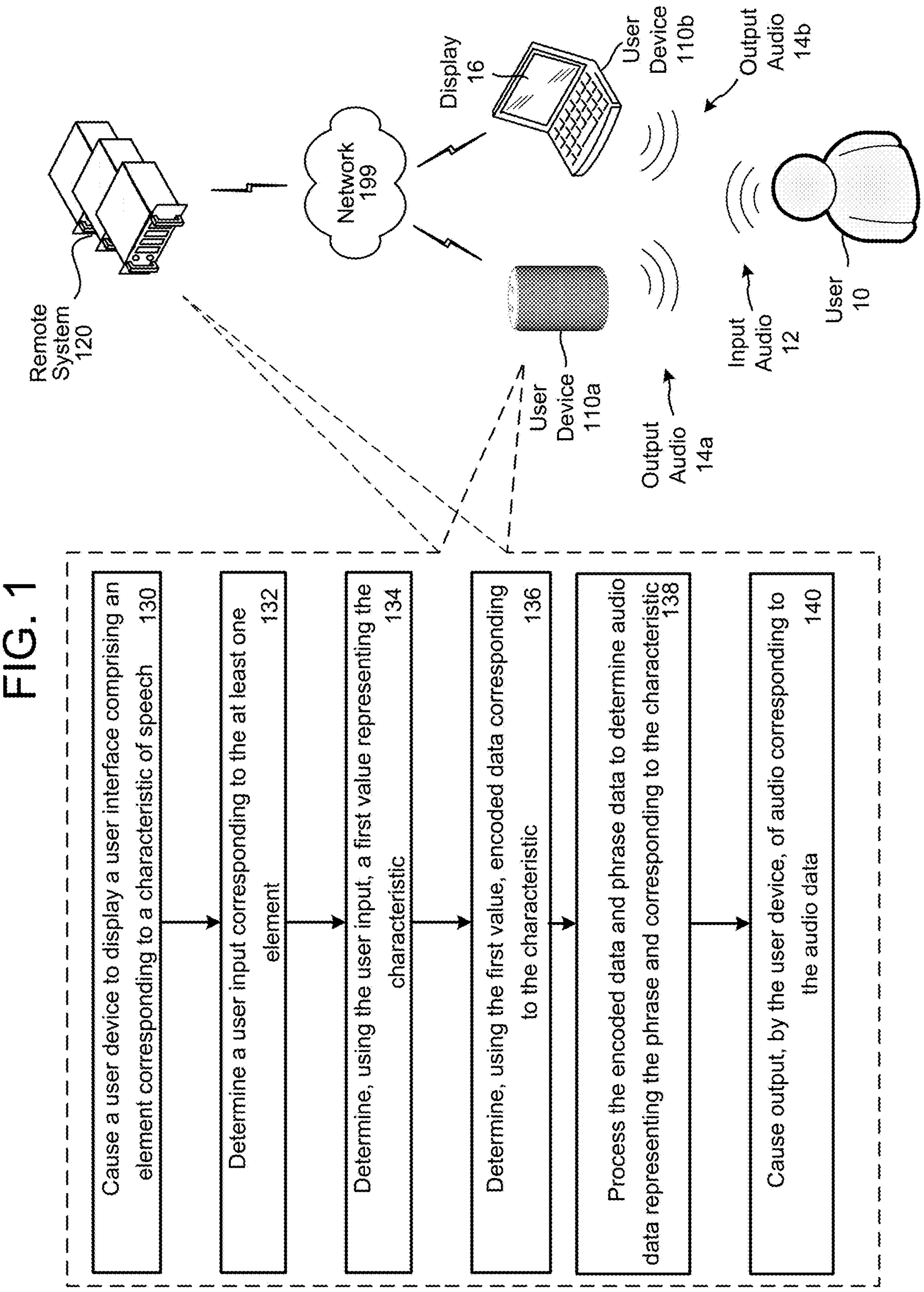
FIG. 1 illustrates a method for speech processing according to embodiments of the present disclosure.

Speech-processing systems may include one or more speech-synthesis components that employ one or more of various techniques to generate synthesized speech from input data (such as audio data, text data, and/or other data) representing first speech. The speech-synthesis component may include a neural-network encoder for processing the input data and determining encoded data representing the speech and a neural-network decoder for processing the encoded data to determine output data representing the speech. The encoder may process further encoded data representing characteristics of speech; the output data may correspond to these characteristics.

A user may wish to cause the speech-synthesis component to generate speech that exhibits one or more user-specified characteristics. These characteristics may include vocal characteristics such as pitch, frequency, and/or tone; these vocal characteristics may correspond to physical properties of a speaker, such as vocal cord length and/or age, mouth shape, throat width, and so on. The characteristics may further include phoneme characteristics, which may also be referred to as prosody; these phoneme characteristics may include cadence, syllable breaks, and/or emphasis, which may not correspond to physical properties of a speaker but rather how the speaker chooses to pronounce a particular word or words. The characteristics may further include higher-level characteristics, such as "male" or "female," "formal or informal," "energetic," and/or "tired." These higher-level characteristics may affect one or more vocal and/or phoneme characteristics and/or may correspond to other characteristics.

The user may thus wish to input parameters corresponding to the characteristics of desired speech and cause the speech-synthesis component to generate corresponding speech. The user may input the parameters using a user interface, such as a graphical user interface and/or voice interface. The speech-synthesis component may process, however, encoded data corresponding to the characteristics in lieu of the input data representing the parameters. The encoded data may be, for example, a 1024-element vector of floating point numbers. A given characteristic, such as pitch, may be specified using a single parameter via the user interface, but may correspond to two or more numbers in the vector of encoded data.

In various embodiments, a speech-parameter determination component processes input data received from a user device (such as data from a graphical user interface and/or from audio data representing speech) to determine one or more speech parameters corresponding to the characteristic (s). An encoded data determination component processes the speech parameters to determine encoded data corresponding to the characteristics. The speech synthesis component may then process input data (e.g., text data) with the encoded data to determine output audio data representing speech exhibiting the characteristics.

In various embodiments, the speech-processing system is disposed on a single device, such as a user device. In other embodiments, the speech-processing system is distributed across one or more user devices, such as a smartphone and/or other smart loudspeaker, and one or more remote systems, such as server(s). The user device may capture audio that includes speech and then process the audio data itself and/or transmit the audio data representing the audio to the remote system for further processing. The remote system may have access to greater computing resources, such as more and/or faster computer processors, than does the user device, and may thus be able to process the audio data and determine an appropriate response faster than the user device. The user device may have, for example, a wakeword-determination component that detects presence of a wakeword in audio and transmits corresponding audio data to the remote system only when the wakeword is detected. As used herein, a "wakeword" is one or more particular words, such as "Alexa," that a user of the user device may utter to cause the user device to begin processing the audio data, which may further include a representation of a command, such as "turn on the lights."

The user device and/or remote system may include an automatic speech-recognition (ASR) component that processes the audio data to determine corresponding text data and a natural-language understanding (NLU) component that processes the text data to determine the intent of the user expressed in the text data and thereby determine an appropriate response to the intent. Determination of the response may include processing output of the NLU component using the speech-synthesis component, which may include a text-to-speech (TTS) processing component, to determine audio data representing the response. The user device may determine the response using a speech-synthesis component of the user device and/or the remote system may determine the response using a speech-synthesis component of the remote system and transmit data representing the response to the user device (or other device), which may then output the response. In other embodiments, a user of a user device may wish to transmit audio data for reasons other than ASR/NLU processing, such as one- or two-way audio communication with one or more other user devices or remote systems.

Referring to FIG. 1, a user 10 may provide input data to a voice-controlled user device 110*a* and/or a display-enabled user device 110*b* (e.g., a device featuring at least one display 16, such as a smartphone, tablet, and/or personal computer). The input data may include one or more user gestures directed to the user device 110*b*, such as a touchscreen input, mouse click, or key press. The input data may further be and/or include input audio 12. The user device(s) 110*a*/110*b* and/or remote system 120 may process the input data to determine one or more parameters representing the characteristics, determine encoded data corresponding to the characteristics, and determine output data representing speech. The device(s) 110*a*/110*b* may output audio 14*a*/14*b* corresponding to the output data.

The user device 110 may, in some embodiments, receive input audio 12 and may transduce it (using, e.g., a microphone) into corresponding audio data. As explained in further detail herein, the user device 110 may perform additional speech processing and/or may send the audio data to a remote system 120 for further audio processing via a network 199. Regardless of whether it is performed by the user device 110 and/or the remote system 120, an ASR component may process the audio data to determine corresponding text data, and an NLU component may process the text data to determine NLU data such as a domain, intent, and/or entity associated with the text data.

Figure 5:
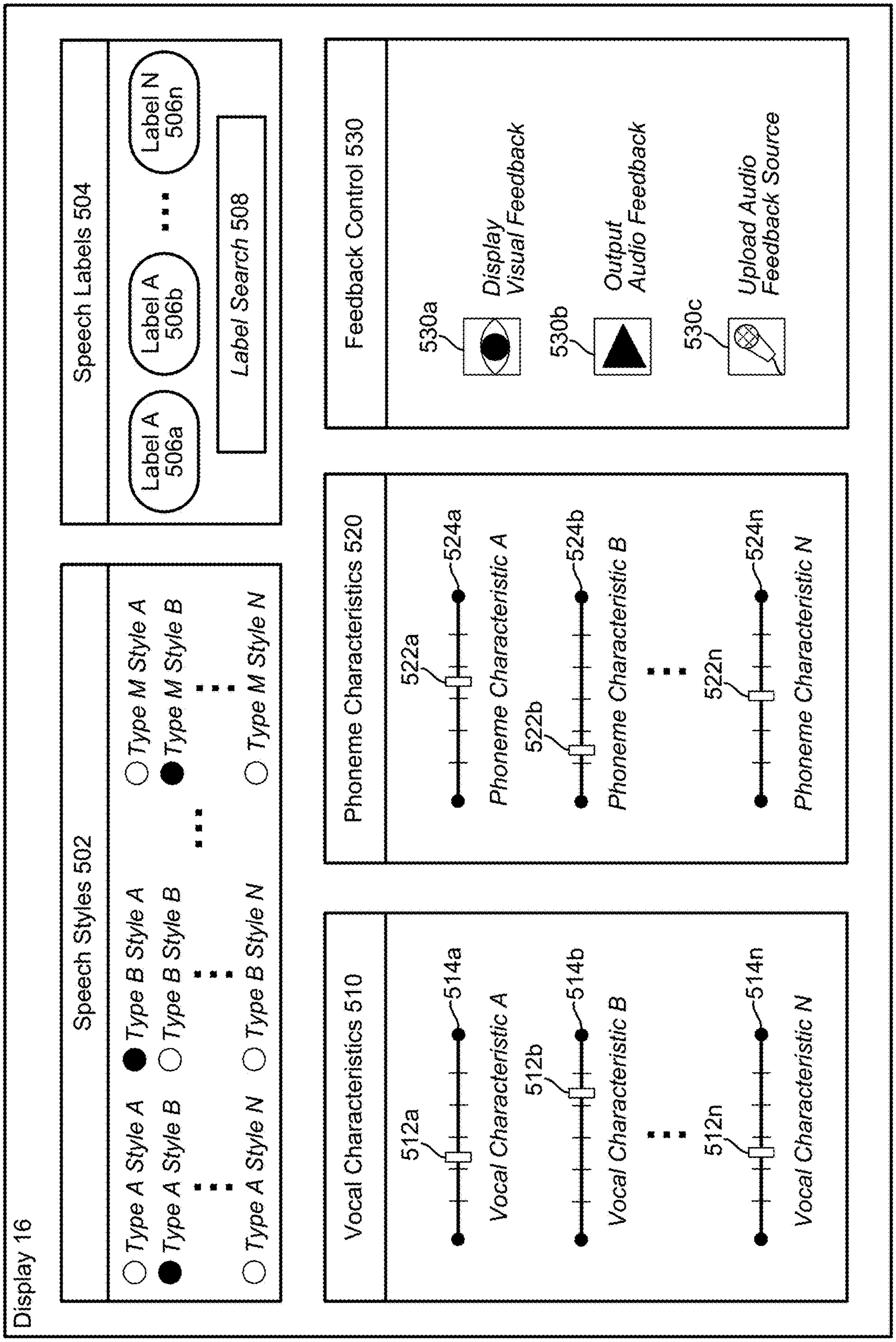
FIG. 5 illustrates a user interface comprising elements corresponding to characteristics of speech according to embodiments of the present disclosure.

In various embodiments, the user device 110 and/or remote system 120 causes (130) the user device to display (using, e.g., the display 16) a user interface comprising at least one element corresponding to a characteristic of speech. As shown in FIG. 5, the user interface may include one or more elements of one or more different types, such as radio buttons, text entry boxes, slider bars, dials, or other such elements. Each element may correspond to a different characteristic, such as tone, pitch, cadence, or emphasis.

The user device 110 and/or remote system 120 determines (132) a user input corresponding to the at least one element. The user input may be, for example, touching and moving a slider bar and/or touching a radio button. The user device 110 and/or remote system 120 may, in determining the user input, determine that a first input corresponds to a touch or click corresponding to the element, that a second input corresponds to a move or drag corresponding to the element, and that a third input corresponds to a release. The user device 110 and/or remote system 120 may update the user interface to reflect the user input, such as moving a slider bar to a point on the display 16 corresponding to the release. The user input may further include other types of input, such as typing on a physical and/or virtual keyboard, movement of a stylus, etc.

The user device 110 and/or remote system 120 determines (134), using the user input, a first value of a parameter representing the characteristic corresponding to the element. The value may represent, for example, the position of a slider bar at the point of the release. For example, if the position of the release corresponds to a point on the slider bar 30% from a left-most end of the slider bar, the value of the parameter may be determined to be 0.3. If the element is a set of radio buttons, the value may corresponds to a representation, such as 0 or 1, of a selected one of the radio buttons.

The user device 110 and/or remote system 120 then determines (136), using the first value, encoded data corresponding to the characteristic. As described herein, a given parameter determined by using the user interface may not corresponds to a single value of encoded data, but rather to a plurality of values. The user device 110 and/or remote system 120 may determine an embedding space of encoded values, each corresponding to different characteristics of speech, wherein different regions of the embedding space represent particular characteristics. The user device 110 and/or remote system 120 may therefore translate the parameters selected by the user interface into a corresponding point in the embedding space and thereby determine the encoded data as the value of the point.

The user device 110 and/or remote system 120 processes (138), using a speech-synthesis component, the encoded data and data representing a phrase to determine audio data representing the phrase and corresponding to the characteristic. As shown below with reference to FIG. 7, the speech-synthesis component may include an encoder and a decoder, and the encoder may process the data (e.g., input text data) using the encoded data to determine second encoded data, which the decoder may process to determine output data. The user device 110 and/or remote system 120 may then cause (140) output of audio corresponding to the audio data. The user 10 may, upon receiving the audio, provide additional input to the user interface to further change the parameters.

Figure 2A:
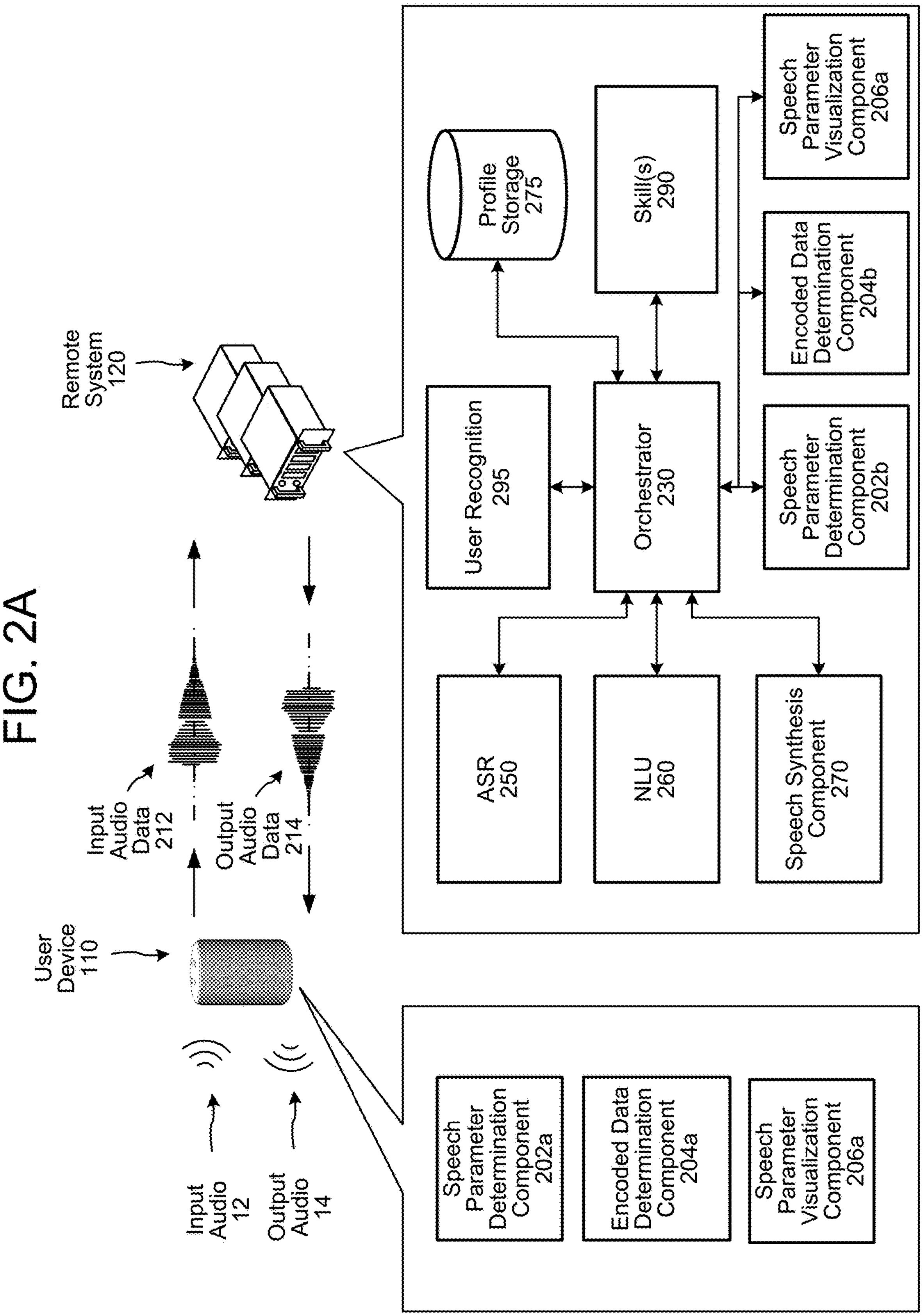
FIG. 2A illustrates components of a user device and of a remote system for speech processing according to embodiments of the present disclosure.
Figure 2B:
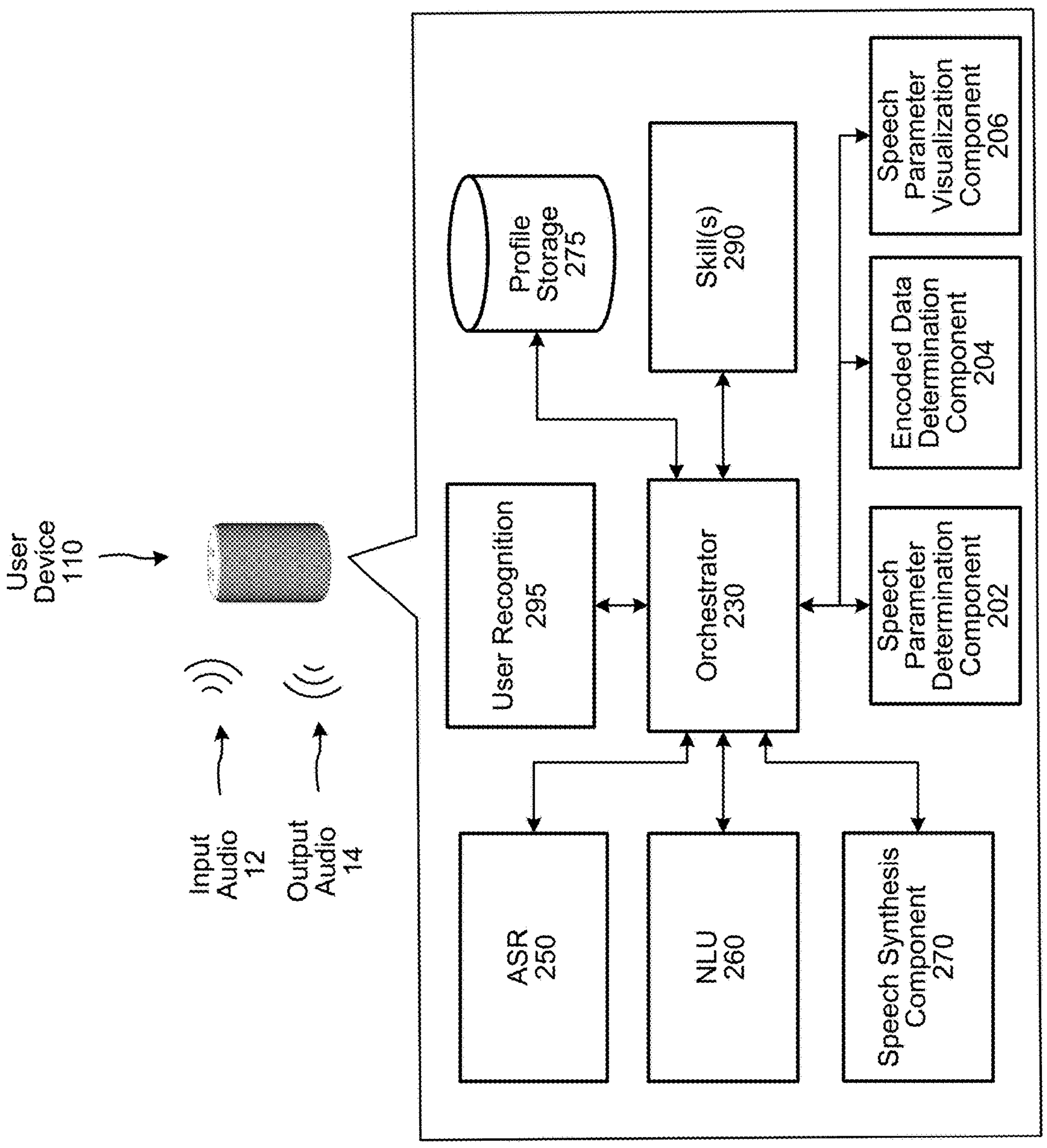
FIG. 2B illustrates components of a user device for speech processing according to embodiments of the present disclosure.

Referring to FIGS. 2A and 2B, a speech-parameter determination component 202 may process speech parameter input data (e.g., data from the user interface and/or audio data) to determine speech parameter data. An encoded data determination component 204 may process the speech parameter data to determine encoded data. A speech synthesis component 270 may process the encoded data (and other input data) to determine synthesize speech data. A speech parameter visualization component 206 may process the speech parameter data 304 to determine speech parameter visualization data. A speech-parameter determination component 202*a*, the encoded data determination component 204*a*, and the speech parameter visualization component 206 may be disposed on the user device 110; in other embodiments, the speech-parameter determination component 202*b*, encoded data determination component 204*b*, speech synthesis component 270, and the speech parameter visualization component 206*b* are disposed on the remote system 120. Each of the speech-parameter determination component 202, encoded data determination component 204, speech synthesis component 270, and the speech parameter visualization component 206 are described in greater detail herein and with reference to FIGS. 3A-3C, 4A-4C, and 7.

Referring to FIG. 2A, the user device 110 may capture audio that includes speech and then either process the audio itself and/or transmit audio data representing the audio to the remote system 120 for further processing. The remote system 120 may have access to greater computing resources, such as more and/or faster computer processors, than does the user device, and may thus be able to process the audio data and determine corresponding output data faster than the user device. The user device 110 may have, a wakeword-determination component that detects presence of a wakeword in audio and transmits corresponding audio data to the remote system only when (or after) the wakeword is detected. As used herein, a "wakeword" is one or more particular words, such as "Alexa," that a user of the user device may utter to cause the user device to begin processing the audio data, which may further include a representation of a command, such as "turn on the lights."

Referring also to FIG. 2B, the speech-processing system, including the speech-parameter determination component 202, encoded data determination component 204, speech synthesis component 270, and the speech parameter visualization component 206 may disposed wholly on the user device 110. In other embodiments, some additional components, such as an ASR component, are disposed on the user device 110, while other components are disposed on the remote system 120. Any distribution of the components of the speech-processing system of the present disclosure is, thus, within the scope of the present disclosure. The discussion herein thus pertains to both the distribution of components of FIGS. 2A and 2B and also to similar distributions.

The user device 110 and/or remote system 120 may further include an automatic speech-recognition (ASR) component that processes the audio data to determine corresponding text data and a natural-language understanding (NLU) component that processes the text data to determine the intent of the user expressed in the text data and thereby determine an appropriate response to the intent. The remote system 120 may determine and transmit data representing the response to the user device 110 (or other device), which may then output the response. In other embodiments, a user of the user device 110 may wish to transmit audio data for reasons other than ASR/NLU processing, such as one- or two-way audio communication with one or more other parties or remote systems.

Before processing the audio data, the device 110 may use various techniques to first determine whether the audio data includes a representation of an utterance of the user 10. For example, the user device 110 may use a voice-activity detection (VAD) component to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands and/or other quantitative aspects. In other examples, the VAD component may be a trained classifier configured to distinguish speech from background noise. The classifier may be a linear classifier, support vector machine, and/or decision tree. In still other examples, hidden Markov model (HMM) and/or Gaussian mixture model (GMM) techniques may be applied to compare the audio data to one or more acoustic models in speech storage; the acoustic models may include models corresponding to speech, noise (e.g., environmental noise and/or background noise), and/or silence.

If the VAD component is being used and it determines the audio data includes speech, the wakeword-detection component may only then activate to process the audio data to determine if a wakeword is likely represented therein. In other embodiments, the wakeword-detection component may continually process the audio data (in, e.g., a system that does not include a VAD component.) The user device 110 may further include an ASR component for determining text data corresponding to speech represented in the input audio 12 and may send this text data to the remote system 120.

The trained model(s) of the VAD component and/or wakeword-detection component may be CNNs, RNNs, acoustic models, hidden Markov models (HMMs), and/or classifiers. These trained models may apply general large-vocabulary continuous speech recognition (LVCSR) systems to decode the audio signals, with wakeword searching conducted in the resulting lattices and/or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN)/recursive neural network (RNN) structures directly, without using a HMM. The wakeword-detection component may estimate the posteriors of wakewords with context information, either by stacking frames within a context window for a DNN, or using a RNN. Follow-on posterior threshold tuning and/or smoothing may be applied for decision making. Other techniques for wakeword detection may also be used.

The remote system 120 may be used for additional audio processing after the user device 110 detects the wakeword and/or speech, potentially begins processing the audio data with ASR and/or NLU, and/or sends corresponding audio data 212. The remote system 120 may, in some circumstances, receive the audio data 212 from the user device 110 (and/or other devices or systems) and perform speech processing thereon. Each of the components illustrated in FIG. 2A may thus be disposed on either the user device 110 or the remote system 120. The remote system 120 may be disposed in a location different from that of the user device 110 (e.g., a cloud server) and/or may be disposed in the same location as the user device 110 (e.g., a local hub server).

The audio data 212 may be sent to, for example, an orchestrator component 230 of the remote system 120. The orchestrator component 230 may include memory and logic that enables the orchestrator component 230 to transmit various pieces and forms of data to various components of the system 120. An ASR component 250, for example, may first transcribe the audio data into text data representing one more hypotheses corresponding to speech represented in the audio data 212. The ASR component 250 may transcribe the utterance in the audio data based on a similarity between the utterance and pre-established language models. For example, the ASR component 250 may compare the audio data with models for sounds (which may include, e.g., subword units, such as phonemes) and sequences of sounds represented in the audio data to identify words that match the sequence of sounds spoken in the utterance. These models may include, for example, one or more finite state transducers (FSTs). An FST may include a number of nodes connected by paths. The ASR component 250 may select a first node of the FST based on a similarity between it and a first subword unit of the audio data. The ASR component 250 may thereafter transition to second and subsequent nodes of the FST based on a similarity between subsequent subword units and based on a likelihood that a second subword unit follows a first.

After determining the text data, the ASR component 250 may send (either directly and/or via the orchestrator component 230) the text data to a corresponding NLU component 260. The text data output by the ASR component 260 may include a top-scoring hypothesis and/or may include an N-best list including multiple hypotheses (e.g., a list of ranked possible interpretations of text data that represents the audio data). The N-best list may additionally include a score associated with each hypothesis represented therein. Each score may indicate a confidence of ASR processing performed to generate the hypothesis with which it is associated.

The NLU component 260 may process the text data to determine a semantic interpretation of the words represented in the text data. That is, the NLU component 260 determines one or more meanings associated with the words represented in the text data based on individual words represented in the text data. The meanings may include a domain, an intent, and one or more entities. As those terms are used herein, a domain represents a general category associated with the command, such as "music" or "weather." An intent represents a type of the command, such as "play a song" or "tell me the forecast for tomorrow." An entity represents a specific person, place, or thing associated with the command, such as "Toto" or "Boston." The present disclosure is not, however, limited to only these categories associated with the meanings (referred to generally herein as "natural-understanding data," which may include data determined by the NLU component 260 and/or the dialog manager component.)

The NLU component 260 may determine an intent (e.g., an action that the user desires the user device 110 and/or remote system 120 to perform) represented by the text data and/or pertinent pieces of information in the text data that allow a device (e.g., the device 110, the system 120, etc.) to execute the intent. For example, if the text data corresponds to "play Africa by Toto," the NLU component 260 may determine that a user intended the system to output the song Africa performed by the band Toto, which the NLU component 260 determines is represented by a "play music" intent. The NLU component 260 may further process the speaker identifier 214 to determine the intent and/or output. For example, if the text data corresponds to "play my favorite Toto song," and if the identifier corresponds to "Speaker A," the NLU component may determine that the favorite Toto song of Speaker A is "Africa."

The user device 110 and/or remote system 120 may include one or more skills 290. A skill 290 may be software such as an application. That is, the skill 290 may enable the user device 110 and/or remote system 120 to execute specific functionality in order to provide data and/or produce some other output requested by the user 10. The user device 110 and/or remote system 120 may be configured with more than one skill 290. For example, a speech-configuration skill may enable use of the speech-parameter determination component 202, encoded data determination component 204, speech synthesis component 270, and the speech parameter visualization component 206 described herein.

In some instances, a skill 290 may provide output text data responsive to received NLU results data. The device 110 and/or system 120 may include a speech synthesis component 270 that generates output audio data from input text data and/or input audio data and the encoded data. The speech synthesis component 270 may use one of a variety of speech-synthesis techniques. In one method of synthesis called unit selection, the speech synthesis component 270 analyzes text data against a database of recorded speech. The speech synthesis component 270 selects units of recorded speech matching the text data and concatenates the units together to form output audio data. In another method of synthesis called parametric synthesis, the speech synthesis component 270 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input text data.

The user device 110 and/or remote system 120 may include a speaker-recognition component 295. The speaker-recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data 212 to stored audio characteristics of other synthesized speech. Output of the speaker-recognition component 295 may be used to inform NLU processing as well as processing performed by the speechlet 290.

The user device 110 and/or remote system 120 may include a profile storage 275. The profile storage 275 may include a variety of information related to individual users and/or groups of users who interact with the device 110. The profile storage 275 may similarly include information related to individual speakers and/or groups of speakers that are not necessarily associated with a user account.

Each profile may be associated with a different user and/or speaker. A profile may be specific to one user or speaker and/or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile and/or may be encompassed under another user profile. As illustrated, the profile storage 275 is implemented as part of the remote system 120. The profile storage 275 may, however, may be disposed on the user device 110 and/or in a different system in communication with the user device 110 and/or system 120, for example over the network 199. The profile data may be used to inform NLU processing, dialog manager processing, and/or speech processing.

Each profile may include information indicating various devices, output capabilities of each of the various devices, and/or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

Figure 3A:
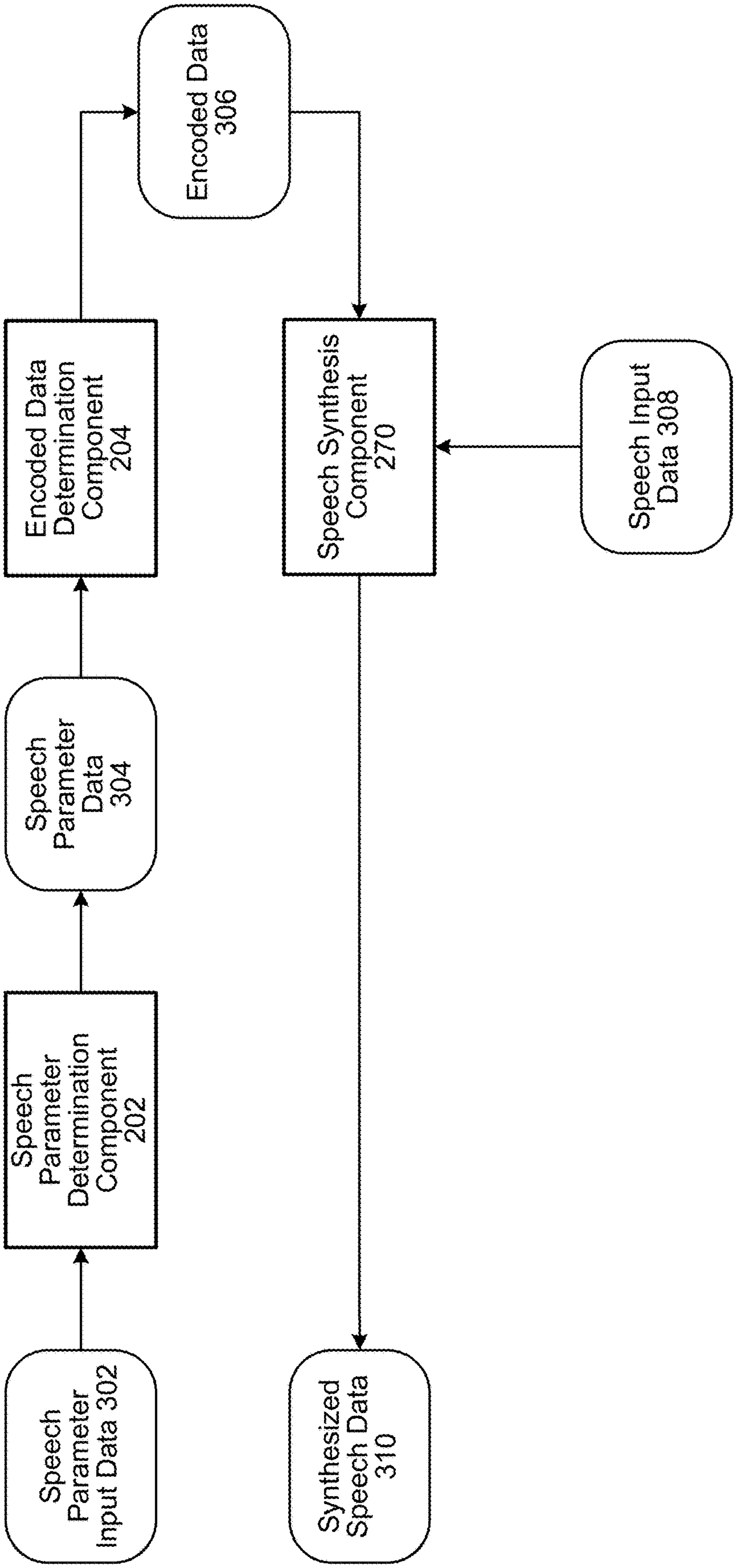
FIGS. 3A, 3B, and 3C illustrate components for synthesizing speech data according to embodiments of the present disclosure.
Figure 3B:
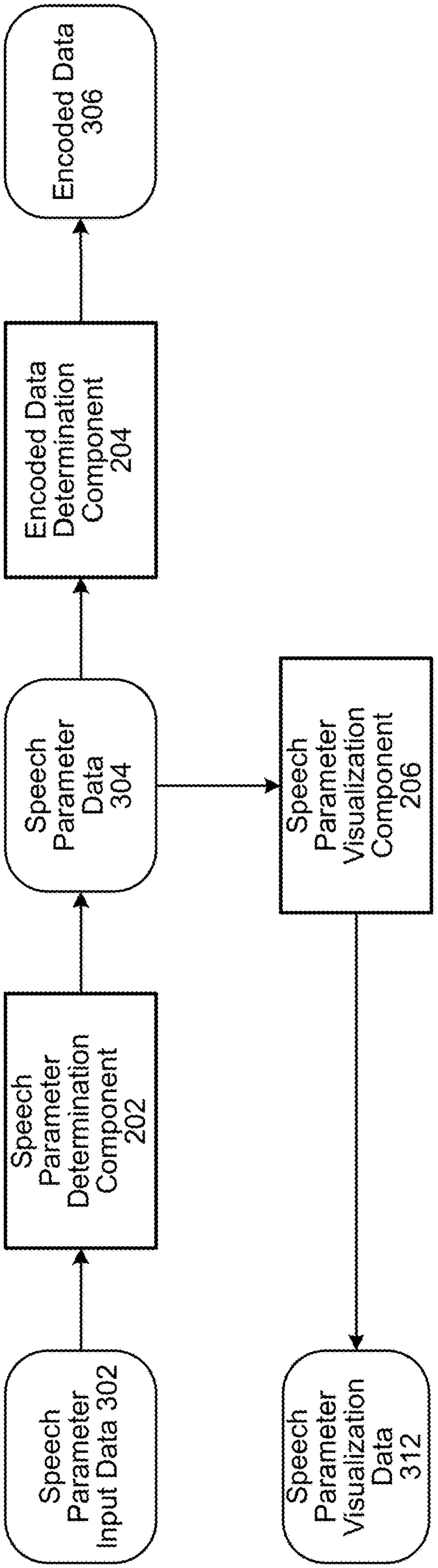
Figure 3C:
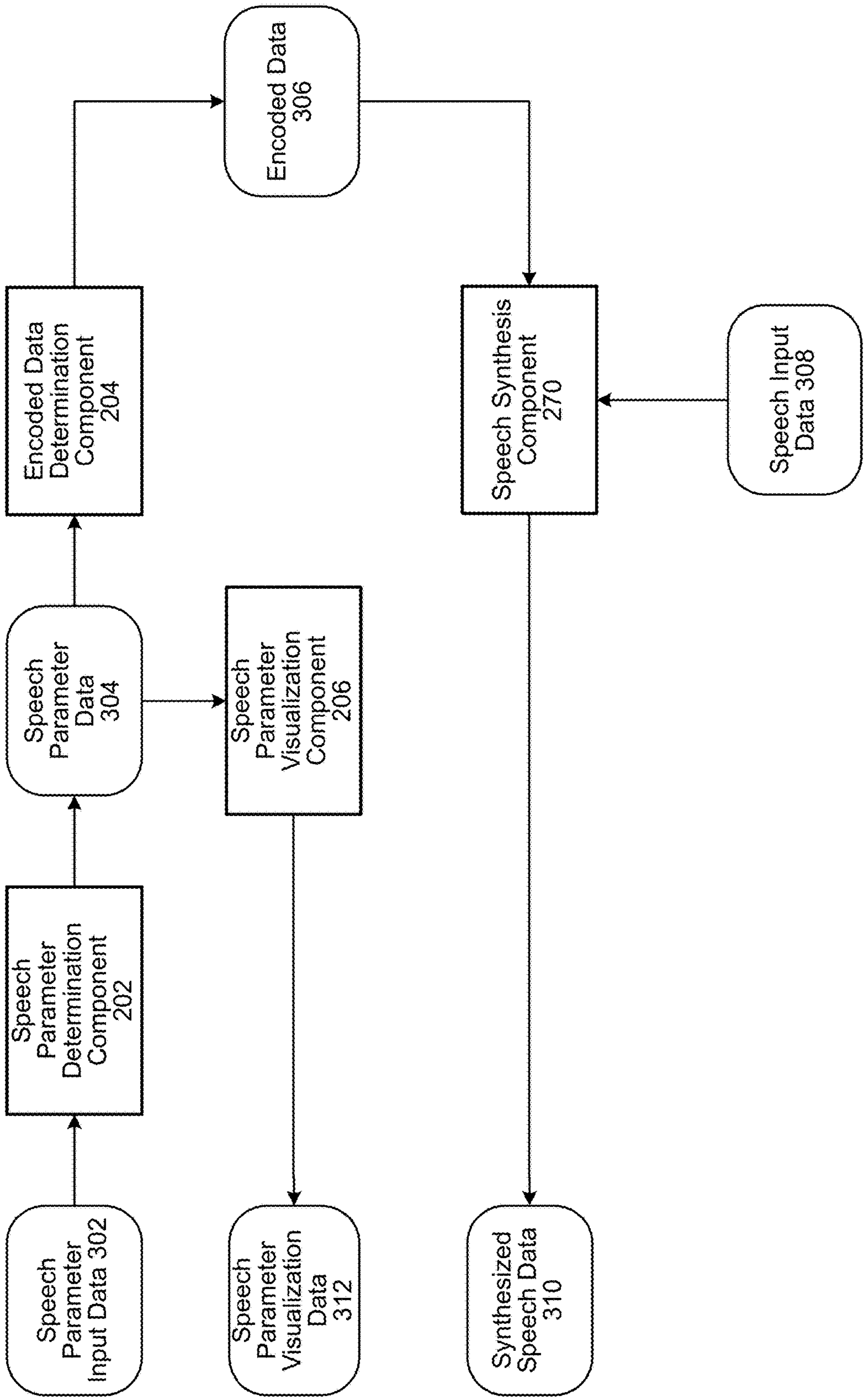

FIGS. 3A-3C illustrate further details of components of the speech-processing system. With reference first to FIG. 3A, a speech-parameter determination component 202 processes speech parameter input data 302 to determine speech parameter data 304. The speech-parameter input data 302 may be one or more inputs received by a display 16 of the user device 110; the inputs may be, for example, touch gestures, mouse inputs, and/or keyboard inputs. The speech-parameter determination component 202 may thus include a graphical user interface (GUI) component for displaying a user interface and determining user inputs related thereto and/or a GUI element evaluation component for determining parameters corresponding to the GUI element. Further details of this embodiment of the speech-parameter determination component 202 are shown below with reference to FIG. 4A.

The speech-parameter input data 302 may further be or include one or more representations of utterances. If, for example, the user device 110 is a voice-controlled device, the user 10 may utter speech corresponding to the one or more characteristics. The utterance(s) may be, for example, "Make the speech more formal," or "Make the speech faster." The speech-parameter determination component 202 may increase or decrease a corresponding parameter from its current value to a new value based on the one or more utterances. In various embodiments, the ASR component 250 and/or the NLU component 260 may process audio data representing the utterance to determine the parameter and/or characteristic, and may send an indication thereof to the speech-parameter determination component 202.

The speech-parameter input data 302 may further be or include other data, such as image and/or video data. The speech-parameter determination component 202 may, for example, process image and/or video data to determine a facial expression of the user 10, a number of persons present in an environment of the user device 110, or other such properties of the image and/or video data. The speech-parameter determination component 202 may determine a change in a corresponding parameter from its current value to a new value based on the one or more properties. For example, if the speech-parameter determination component 202 determines that the image data includes a representation of a smiling face, the speech-parameter determination component 202 may determine a decrease in a parameter corresponding to formality of the speech (e.g., from a more formal value to a less formal value). Similarly, if the speech-parameter determination component 202 determines that the image and/or video data includes representations of two or more persons, the speech-parameter determination component 202 may determine an increase in a parameter corresponding to amplitude of the speech.

The speech parameter data 304 may include a representation of a list of available speech parameters and corresponding values of the parameters. If the parameter corresponds to a graphical element such as a slider bar, the value may represent a relative position of a slider element of the slider bar. For example, if a leftmost position of the slider bar corresponds to a value of 0, and a rightmost position of the slider bar corresponds to a value of 1, a value of 0.5 may correspond to the slider of the slider bar being in a center position. If a graphical element includes a group of radio buttons, the speech parameter data 304 may include a representation a selected one of the radio buttons and/or an indication of the group. The speech parameter data 304 may include some or all of the parameters displayed on the display 16. In some embodiments, the speech parameter data 304 includes only parameters that differ from default values.

An encoded data determination component 204 may process the speech parameter data 304 to determine encoded data 306. As described herein, the speech parameter data 304 may include representations of approximately 20 values of parameters corresponding to characteristics of speech, such as a first parameter corresponding to pitch, a second parameter corresponding to speech rate, etc. The encoded data 306 may include a representation of an N-dimensional vector of values that may be processed by the speech-synthesis component 270 to determine synthesized speech data 310 that corresponds to the characteristics specified by the input parameters. The vector may have a number of values, such as 1024 values; each parameter of the speech parameter data 304 may correspond to one or more values of the vector. The encoded data determination component 204 may thus determine, for a given parameter of the speech parameter data (and/or change in a value of the parameter) which values of the vector of the encoded data 306 to change and how much to change them.

The encoded data 306 may correspond to one or more points in an embedding space of speech characteristics, wherein each point is associated with one or more different characteristics. The embedding space may be an N-dimensional space, wherein each dimension of the embedding space corresponds to a dimension (e.g., degree of freedom) of the vector. Points in the embedding space near each other may correspond to similar characteristics, while points far from each other may correspond to dissimilar characteristics. Regions of the embedding space may thus correspond to one or more different characteristics; a first region in the embedding space may, for example, represent speech having formal characteristics, while a second region in the embedding space may correspond to speech having male characteristics.

The embedding space may be defined by processing speech data representing utterances exhibiting different characteristics with an encoder, such as a neural network encoder. First audio data may, for example, include a representation of an utterance associated with the characteristics "male" and "loud." The encoder may process this audio data and determine output encoded data that represents the characteristics. The point and/or region in the embedding space corresponding to the encoded data may then be associated with the characteristics exhibited by the utterance.

Points and/or regions in the embedding space may further be associated with one or more different characteristics via experimentation. A first vector of encoded data 306 may be used by the speech synthesis component 270 to create speech data 310, which may be output by the user device 110 as audio. The user 10 may then input, to the user device 110, one or more perceived characteristics corresponding to the speech data 310, such as "male" and/or "fast." The encoded data determination component 204 may then associate these characteristics with the first vector of the encoded data 306. This process may be repeated for other vectors of the encoded data 306 and additional points and/or regions in the embedding space may be similarly associated with other characteristics.

In some embodiments, the encoded data determination component 204 determines a point or region in the embedding space most closely corresponding to values of the speech parameter data 304 and determines the values of the encoded data 306 by determining corresponding values of the embedding space corresponding to the point and/or region. For example, if a parameter of the speech parameter data 304 corresponds to "female," the encoded data determination component 204 may determine a point or region in the embedding space that corresponds to "female," as that point or region may have been identified as described above. If a second parameter of the speech parameter data 304 corresponds to "formal," the encoded data determination component 204 may determine a point or region in the embedding space that corresponds to both "female" and "formal." The encoded data determination component 204 may similarly identify other points and/or regions in the embedding space that correspond to additional parameters of the speech parameter data 304. The encoded data determination component 204 may select a center (e.g., average) point of an identified region in the embedding space to determine the encoded data 306.

In some embodiments, the encoded data determination component 204 determines two or more points and/or regions in the embedding space most closely corresponding to values of the speech parameter data 304 and determines the encoded data 306 by interpolating between the two or more points and/or regions. The interpolation may include an averaging of corresponding values of each point, wherein a first value of a first point is averaged with a corresponding second value of a second point to determine a first averaged value, a third value of the first point is averaged with a corresponding fourth value of the second point, and so on. In some embodiments, the interpolation is based at least in part on a relative position of an element of the user interface, such as the relative position of a slider of a slider bar with respect to a range of values of the slider bar. If, for example, the slider is positioned at a point 75% from a leftmost position of the slider bar, the interpolated point may correspond to a point in the embedding space 75% of the distance from a first point to a second point. The interpolation may be a linear interpolation, logarithmic interpolation, polynomial interpolation, or other interpolation.

The speech synthesis component 270 may process speech input data 308 and the encoded data 306 to determine synthesized speech data 310 corresponding to the characteristics of the encoded data 306. The speech input data may be text data representing words and/or audio data including a representation of an utterance. The speech synthesis component 270 is described in greater detail with reference to FIG. 7.

Figure 6:
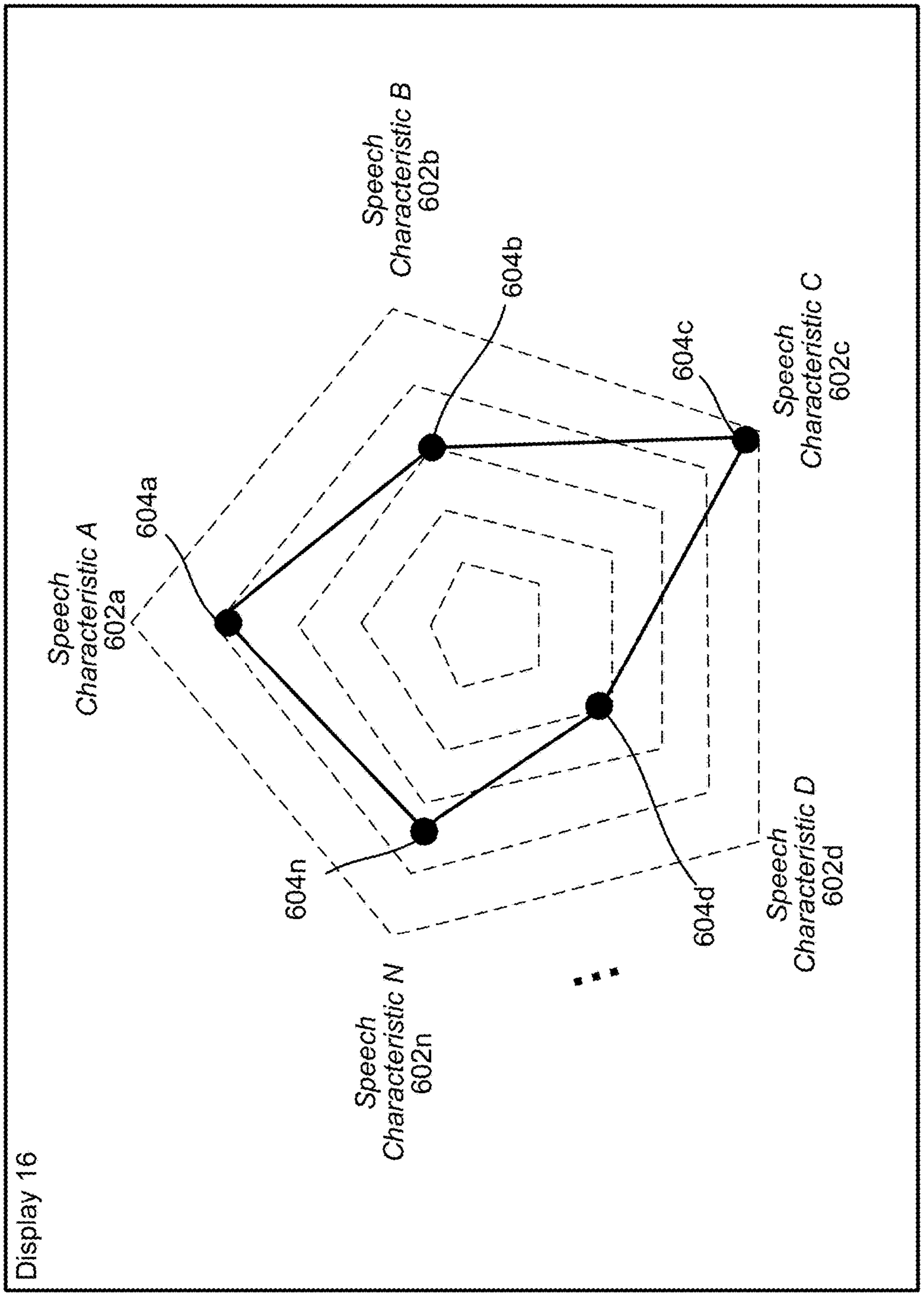
FIG. 6 illustrates a visualization of characteristics of speech according to embodiments of the present disclosure.

Referring to FIG. 3B, in some embodiments, a speech parameter visualization component 206 may process the speech parameter data 304 to determine speech parameter visualization data 312, which may be image data that the speech parameter visualization component 206 may cause to be displayed on a display 16 of the user device 110. An example of the speech parameter visualization data 312 is shown in FIG. 6. The speech parameter visualization data 312 may include a representation of one or more characteristics of the speech, such as speech rate and/or amplitude.

In some embodiments, the speech parameter data 304 includes representations of a first number of characteristics while the speech parameter visualization data 312 includes a representation of a second number of characteristics, wherein the second number is less than the first number. For example, the speech parameter data 304 may include a representation of twenty characteristics, and the speech parameter visualization data 312 includes a representation of five characteristics. The speech parameter visualization component 206 may thus select a subset of the first number of characteristics for inclusion in the speech parameter visualization data 312. The speech parameter visualization data 312 may rank the characteristics of the speech parameter data 304 based on a difference between each characteristic from a default value of the characteristic and include in the speech parameter visualization data 312 a number of characteristics having the highest rank. If, for example, a first characteristic corresponds to an element such as a slider bar, and if the slider bar corresponds to values from 0 to 10 (0 representing a leftmost position of a slider of the slider bar and 10 representing a rightmost position of the slider), a default value of the slider of the element may be 5. If the speech parameter data 304 indicates that the value of the corresponding parameter is also 5 (e.g., the user 10 did not specify, via a gesture or other input, a value other than the default), the rank of that characteristic may be small (e.g., low), and the speech parameter visualization component 206 may not include that characteristic in the speech parameter visualization data 312. If, on the other hand, a second characteristic similarly corresponds to a default value of 5, but the speech parameter data 304 indicates that the value of the corresponding parameter is something other than 5 (e.g., 1, 2, 9, or 10), the speech parameter visualization component 206 may include that characteristic in the speech parameter visualization data 312.

The speech parameter visualization component 206 may further normalize the selected, highest-ranking characteristics across a range (e.g., from 1 to 10) to thereby better present differences between the selected characteristics in the speech parameter visualization data 312. If, for example, five selected characteristics correspond to parameter values of 6, 7, 8, 9, and 10, the speech parameter visualization component 206 may normalize the values across the range 1 to 10 such that the normalized values are 2, 4, 6, 8, and 10.

Referring to FIG. 3C, in some embodiments, the speech-processing system includes components to determine both the speech parameter visualization data 312 and the synthesized speech data 310. For example, the speech processing system may cause output the speech parameter visualization data 312 after a first gesture directed to the display 16 and may cause output of the synthesized speech data 310 after a second gesture directed to the display 16. The speech processing system may cause said outputs after determining a change to the speech parameter data 304 and/or after determining a gesture directed toward an element associated with the output.

Figure 4A:
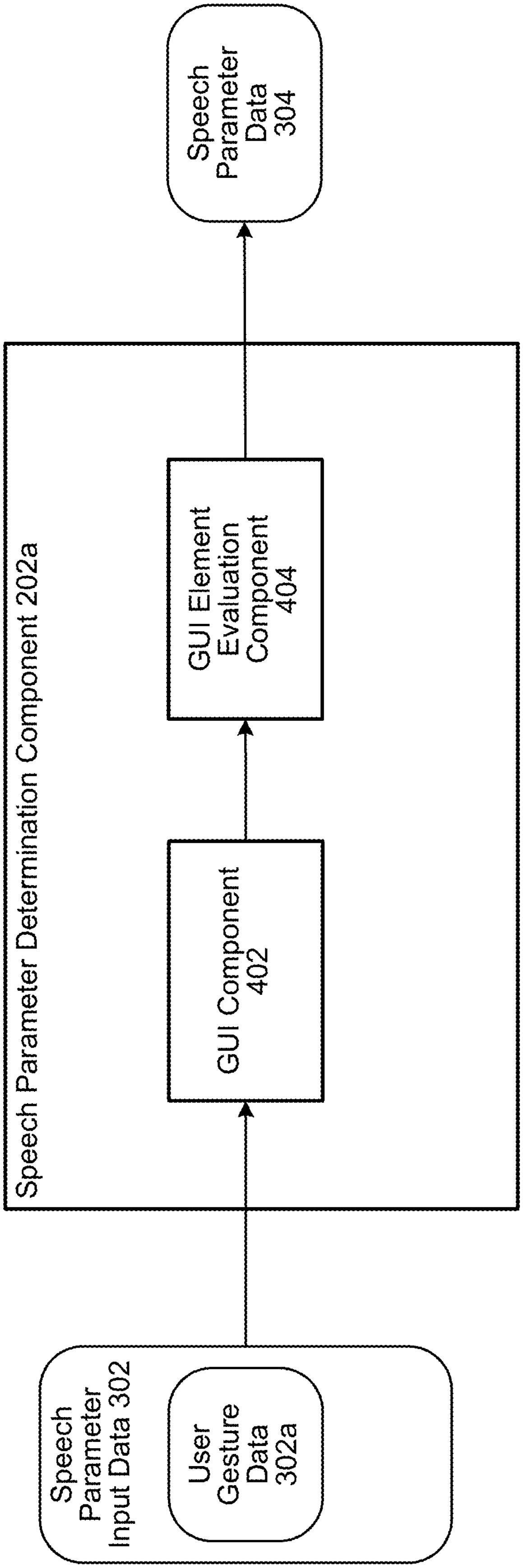
FIGS. 4A, 4B, and 4C illustrate components for processing input data according to embodiments of the present disclosure.
Figure 4B:
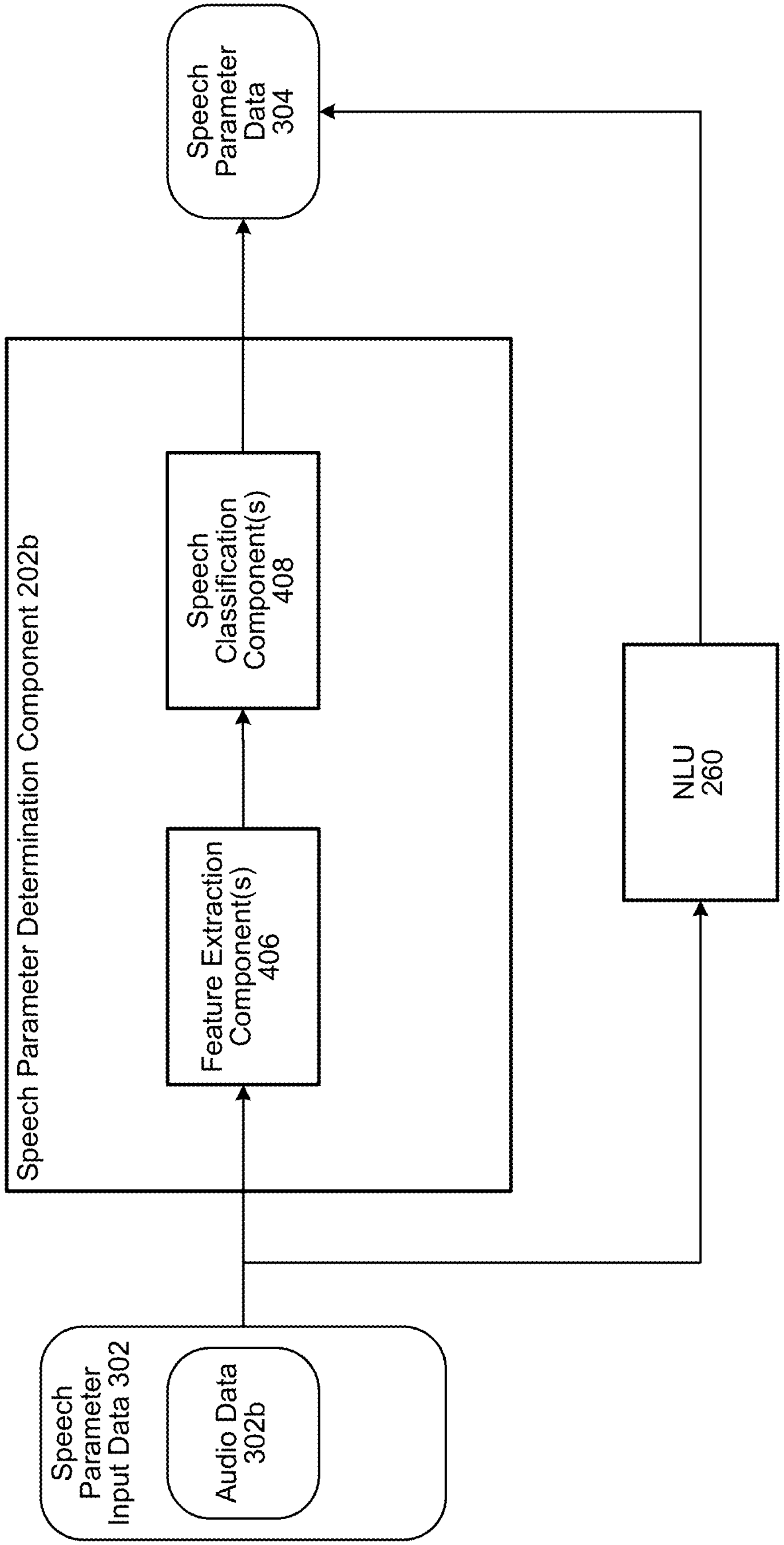
Figure 4C:
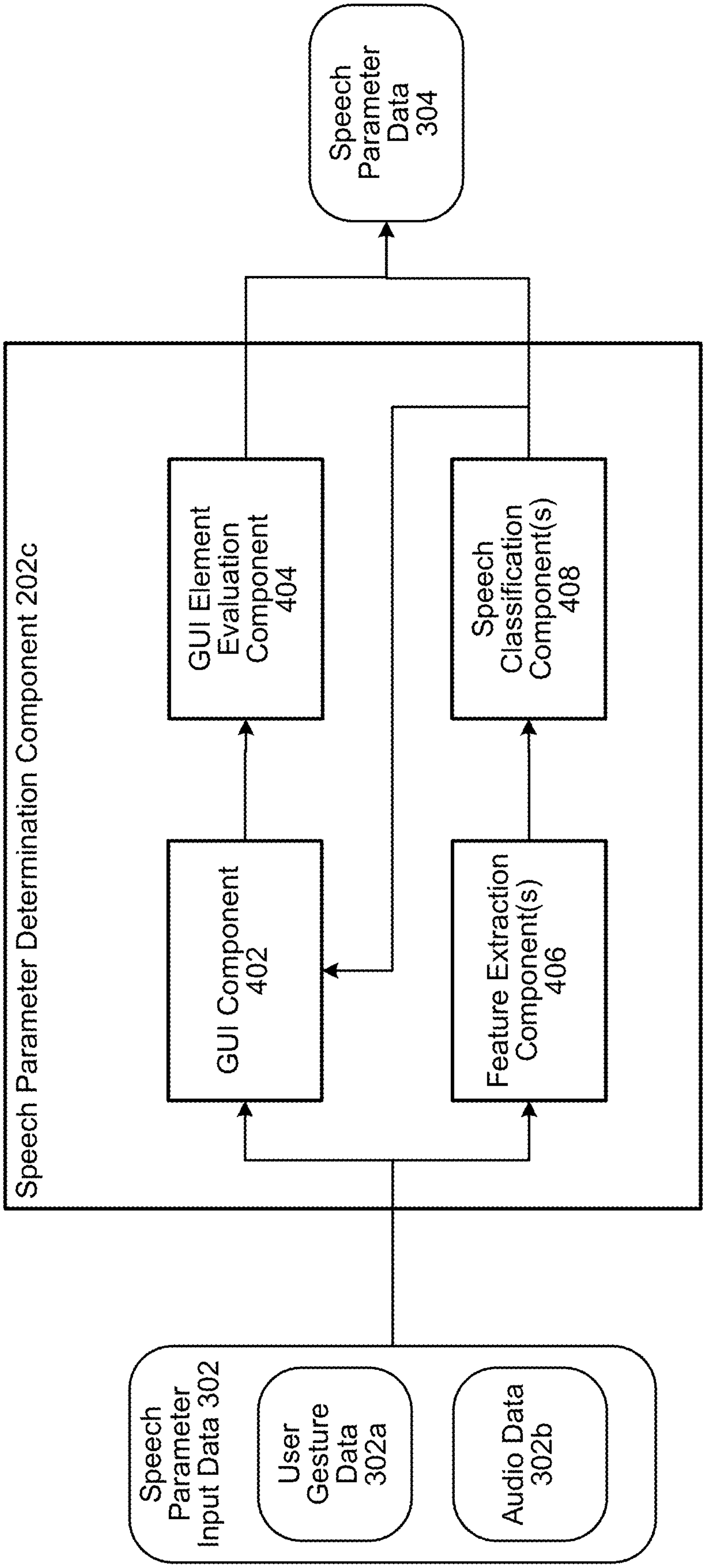

FIGS. 4A, 4B, and 4C illustrate components for processing input data according to embodiments of the present disclosure. Referring first to FIG. 4A, the speech parameter input data 302 may include user gesture data 302*a*, which may correspond to one or more gestures of the user 10. The gestures may include, for example, a touch gesture, a mouse input, and/or a keyboard input. A GUI component 402 may cause display of a GUI (such as the GUI shown in FIG. 5) on the display 16 and may determine that a gesture of the user gesture data 302*a* corresponds to one or more elements of the GUI. The GUI component 402 may cause the GUI to change one or more elements based on the gesture, such as causing selection of a radio button corresponding to the gesture or causing a slider of a slider bar to move in accordance with the gesture. The GUI component may further cause the GUI to display different information corresponding to the gesture, such as one or more labels 506 associated with text entry to a label search element 508.

A GUI element evaluation component 404 may determine the speech parameter data 304 based on the elements of the GUI. The GUI element evaluation component 404 may, for example, determine which of a set of radio buttons defined by the GUI component 402 is selected and determine a representation of the selection for inclusion the in the speech parameter data 304. For example, if a "male" radio button is selected, the GUI element evaluation component 404 may include, in the speech parameter data 304, a representation of "sex=0." If, on the other hand, a "female" radio button is selected, the GUI element evaluation component 404 may include, in the speech parameter data 304, a representation of "sex=1." The GUI element evaluation component 404 may further determine a relative position of a slider corresponding to a slider bar and include, in the speech parameter data 304, a value representing the relative position.

Referring to FIG. 4B, the speech parameter input data 302 may be or include audio data 302*b*, which may include a representation of speech. A feature extraction component 406 may extract one or more features of the audio data 302*a*, such as frequency data, spectrogram data, and/or Mel-spectrogram data. The feature extraction component 406 may thus include one or more Fourier transform components, one or more Mel transform components, or other such components.

The speech parameter determination component 202*b* may further include one or more speech classification components 408 (e.g., classifiers) for processing the one or more outputs of the feature extraction components 406. Each classifier 408 may be a neural network and may be trained using training data to determine one or more of the parameters of the speech parameter data based on one or more features extracted by the feature extraction component 406. For example, a first classifier 408 may determine whether the audio data 302*b* corresponds to "male" or "female"; this classifier 408 may have been trained, for example, using training data comprising a first set of utterance corresponding to a male voice and a second set of utterances corresponding to a female voice. Other classifiers 408 may process the features and output a range of values, such as values between 0.0 and 1.0 representing a speech rate of speech represented in the audio data 302*b*.

Thus, as described above, the audio data 302*b* may include a representation of speech that may be processed by the feature extraction component(s) 406 and/or speech classification component(s) 408 to determine the speech parameter data 304. In other words, the audio data 302*b* may represent an example of speech selected by the user 10 that exhibits one or more characteristics that the user 10 wishes to include in the synthesized speech data 310.

In other embodiments, the audio data 302*b* may instead or in addition include a representation of one or more words describing the one or more characteristics. For example, the audio data 302*b* may include a representation of the words "male" and "newscaster." The NLU component 260 may thus instead or in addition process the audio data 302*b* to determine one or more items of speech parameter data 304 corresponding to the words represented in the audio data 302*b*.

Referring to FIG. 4C, the speech parameter input data 302 may include both user gesture data 302*a* and audio data 302*b*. The user 10 may, for example, first input the audio data 302*b*, from which the speech classification components 408 may determine first speech parameter data 304. The user 10 may then, via the GUI determined by the GUI component 402, further input one or more gestures corresponding to the gesture data 302*a*. In some embodiments, the parameters determined by the speech classification components 408 are sent to the GUI component 402, which may alter elements of the GUI based thereon. In other words, elements such as sliders of slider bars of the GUI may be changed to reflect the values determined by the speech classification component 408.

The speech parameter determination component 202 may cause the speech parameter data 304 to be stored, in the profile storage 275, in a user profile associated with the user 10. The speech parameter determination component 202 may then retrieve, from the user profile, the stored speech parameter data 304. The user 10 may thus determine characteristics of speech at a first point in time using a first user device 110 and then later, at a second point in time after the first point in time, retrieve the speech parameter data 304 corresponding to the characteristics. The speech parameter determination component 202 may similarly store, in the user profile, first speech parameter data 304 associated with first characteristics and second speech parameter data associated with second characteristics. The user 10 may thus determine two or more different sets of characteristic representing different speech, which may be later used in (for example) different applications. In some embodiments, the user 10 may specify first speech parameter input data 302 using a first user device 110, such as a voice-controlled device 110*a*, and later modify the first speech parameter input data 302 to determine second speech parameter input data using a second user device, such as a display-enabled device 110*b*.

FIG. 5 illustrates a graphical user interface comprising elements corresponding to characteristics of speech according to embodiments of the present disclosure; the GUI may be displayed on the display 16. A first set of elements of the GUI may correspond to speech styles 502, and may include one or more sets of radio buttons, check buttons, and/or other types of buttons or selection elements. Each set of radio buttons may allow selection of one radio button of the set; if a second button of the set is selected, the first button may be de-selected. For example, a first set of radio buttons may include a first button for "male" and a second button for "female"; selection of the "male" button may cause de-selection of the "female" button, and vice-versa. Other examples of sets of radio buttons may be a first set including "formal" and "informal," and a second set including "happy," "sad," and "angry." Any number of sets and any types of sets are within the scope of the present disclosure.

The GUI may further include a second set of elements corresponding to speech labels 504. A speech label may correspond to an adjective describing speech, such as "expressive" or "young." A label search element 508 may be configured to receive text data from, for example, a physical and/or virtual keyboard specifying a label. The speech labels may display further elements corresponding to specific labels 506; these labels 506 may correspond to labels received by the label search element 508.

The GUI may further include slider bars (and/or similar elements, such as dials or text entry elements) specifying vocal characteristics 510 and/or phoneme characteristics 520. The vocal characteristics 510 may correspond to characteristics of speech defined by physical properties of a user 10, such as vocal cord size and length and mouth shape. Examples of vocal characteristics 510 include pitch, tone, and or frequency. Vocal characteristics 510 of a user 10 may not vary across different utterances of the user 10 (e.g., these physical properties are invariant of the particular words spoken by the user 10). As described above, the vocal characteristics may be input using slider bars 514 and associated sliders 512.

The phoneme characteristics 520 may correspond to characteristics of speech defined by pronunciation of the user 10. Examples of phoneme characteristics 520 include cadence, syllable breaks, and/or emphasis. Phoneme characteristics 520 of a user 10 may vary across different utterances of the user 10 (e.g., user 10 may utter the same speech different ways). The phoneme characteristics may be similarly input using slider bars 524 and associated sliders 522.

The GUI may further include a feedback control element 530. A first element of the feedback control element 530 may be an element 530*a* to cause display of visual feedback (e.g., the speech parameter visualization data 312) on the display 16. In some embodiments, the speech parameter visualization data 312 is instead or in addition displayed on the display 16 if and when the feedback control element 530 determines a change in the speech parameter data 304 (after, e.g., the user 10 has input a gesture to cause said change). In some embodiments, the speech parameter visualization data 312 causes a delay of a period of time (e.g., 1 or 2 seconds) after determining the change before causing display of the speech parameter visualization data 312.

A second element 530*b* of the feedback control elements 530 may cause output of audio feedback (e.g., output of audio corresponding to the synthesized speech data 310). In some embodiments, the synthesized speech data 310 includes a representation of default speech input data 308, such as data corresponding to the phrase, "Here is an example of the speech." In other embodiments, the user 10 may select the speech input data 308 using a third element 530*c* to upload an audio feedback source. For example, if the user 10 wishes to create speech resembling a newscaster, the user 10 may specify, via the third element 530*c*, speech input data 308 corresponding to a news item. The speech input data 308 may be or include text data corresponding to the news item and/or audio data including a representation of speech corresponding to the news item.

FIG. 6 illustrates an example of the speech parameter visualization data 312 determined by the speech parameter visualization component 206 according to embodiments of the present disclosure. As described above, the speech parameter visualization component 206 may determine one or more speech characteristics 602, which may correspond to subset of the parameters of the speech parameter data 304, based at least in part on a ranking of the parameters of the speech parameter data 304. The speech parameter visualization component 206 may further normalize the selected parameters to a certain range, for example the range 1-10. The speech parameter visualization component 206 may include, in the speech parameter visualization data 312, any number of characteristics, such as 2-6 characteristics. The speech parameter visualization data 312 may be or include a "web" chart, as shown in FIG. 6, in which the various characteristics 602*a*, 602*b*, . . . 602*n* are plotted radially around a central point such that a distance of a vertex 604*a*, 604*b*, . . . 604*n* from the central point indicates the position of the corresponding parameter within the corresponding range. The speech parameter visualization data 312 may be or include other types of charts, such as bar chart or a pie chart.

In various embodiments, the display 16 of the speech parameter visualization data 312 comprises a graphical user interface that may receive user input, such as gestures, that may modify one or more of the displayed speech characteristics 602. For example, a user input may indicate selection of a vertex 604 (e.g., a touch gesture on or near the vertex 604) and may indicate movement of the vertex 604 on the display 16 (e.g., a drag or slide gesture). The speech parameter visualization component 206 and/or the GUI element evaluation component 404 may determine an updated set of speech parameter data 304 as indicated by the user input to the display 16. This updated speech parameter data 304 may then be processed (by, for example, the encoded data determination component 204 and/or the speech synthesis component to determine updated synthesized speech data 310 and/or updated speech parameter visualization data 312.

Figure 7:
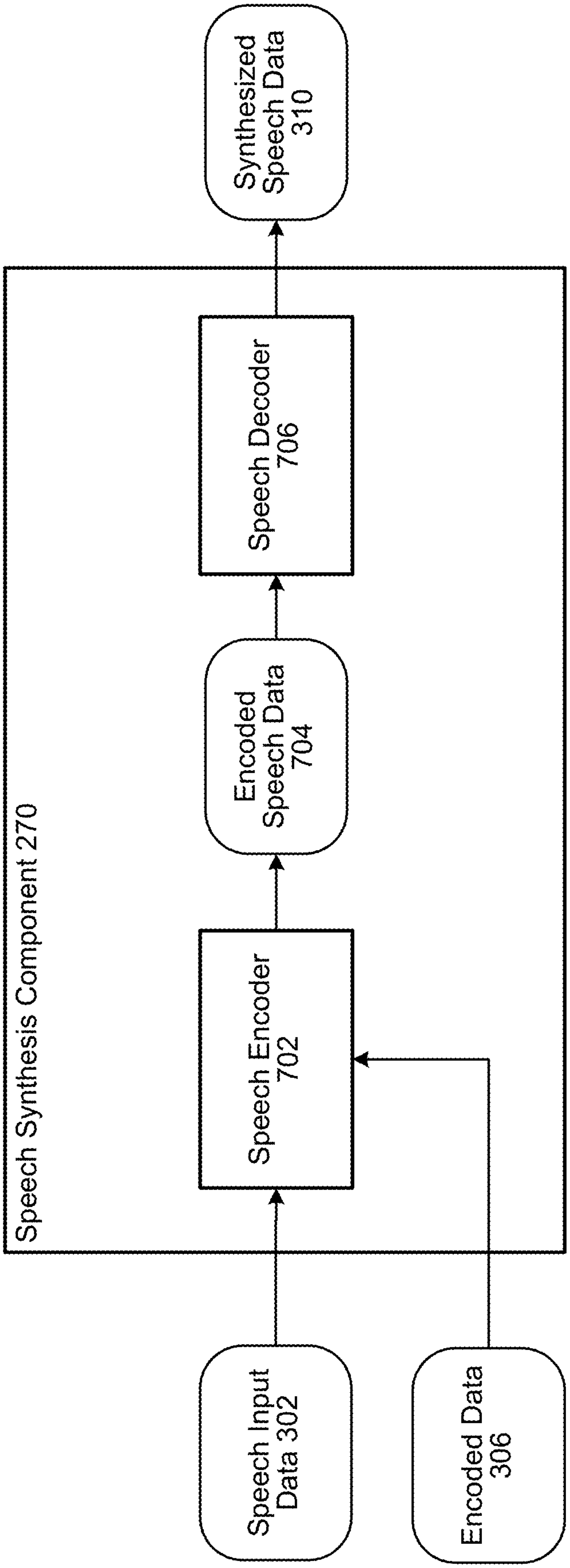
FIG. 7 illustrates a speech synthesis component according to embodiments of the present disclosure.

FIG. 7 illustrates the speech synthesis component 270 according to embodiments of the present disclosure. The speech-synthesis component 270 may include a speech encoder 702 and/or speech decoder 706, which may include one or more neural-network layers, such as one or more CNN layers and/or one or more recurrent layers, such as long short-term memory (LSTM) and/or gated recurrent unit (GRU) layers. The present disclosure is not, however, limited to any particular type or arrangement of layers for either the speech encoder 702 and/or speech decoder 706, and any type of layers or arrangement thereof are within its scope. The speech encoder 702 may process the speech input data 302 and the encoded data 306 to determine encoded speech data 704, which may be an encoded value corresponding to a phrase represented in the input data 302 and the characteristics represented in the encoded data 306. The decoder 706 may process the encoded speech data 704 to determine the synthesized speech data 310, which may be or include audio data representing the speech. The synthesized speech data 310 may be output to the user 10 as described herein, or may be used in other applications, such as in providing responses to voice commands.

The encoder and/or decoder may include one or more neural networks, each of which may include nodes organized as an input layer, one or more hidden layer(s), and an output layer. The input layer may include m nodes, the hidden layer(s) n nodes, and the output layer o nodes, where m, n, and o may be any numbers and may represent the same or different numbers of nodes for each layer. Nodes of the input layer may receive inputs (e.g., audio data), and nodes of the output layer may produce outputs (e.g., spectrogram data). Each node of the hidden layer(s) may be connected to one or more nodes in the input layer and one or more nodes in the output layer. The neural network(s) may include multiple hidden layers; in these cases, each node in a hidden layer may connect to some or all nodes in neighboring hidden (or input/output) layers. Each connection from one node to another node in a neighboring layer may be associated with a weight and/or score. A neural network may output one or more outputs, a weighted set of possible outputs, or any combination thereof.

The neural network may also be constructed using recurrent connections such that one or more outputs of the hidden layer(s) of the network feeds back into the hidden layer(s) again as a next set of inputs. Each node of the input layer connects to each node of the hidden layer; each node of the hidden layer connects to each node of the output layer. As illustrated, one or more outputs of the hidden layer is fed back into the hidden layer for processing of the next set of inputs. A neural network incorporating recurrent connections may be referred to as a recurrent neural network (RNN).

Processing by a neural network is determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with a lattice to improve speech recognition when the entire lattice is processed.

Figure 8:
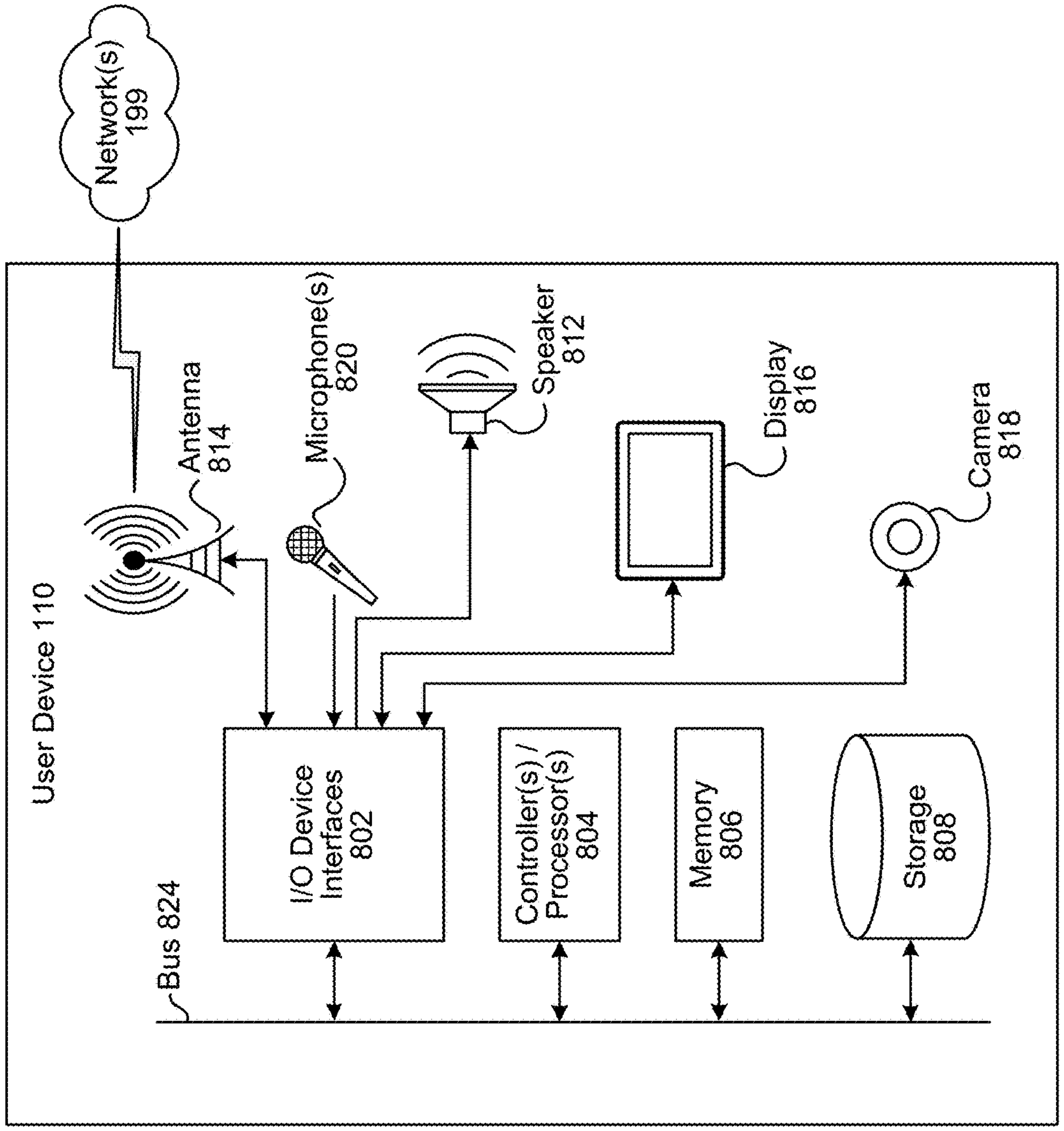
FIG. 8 illustrates components of a user device for speech processing according to embodiments of the present disclosure.
Figure 9:
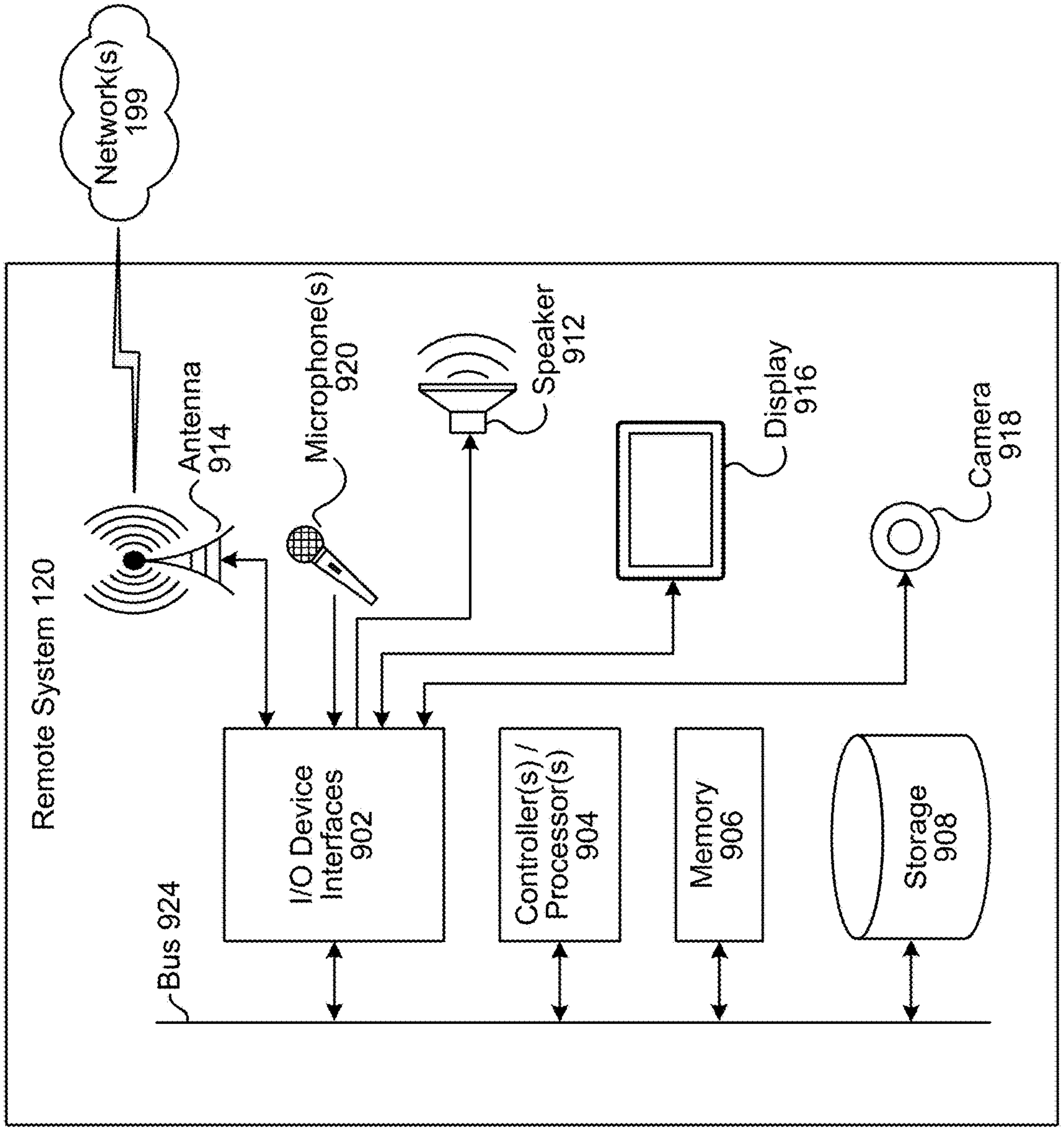
FIG. 9 illustrates components of a remote system for speech processing according to embodiments of the present disclosure.
Figure 10:
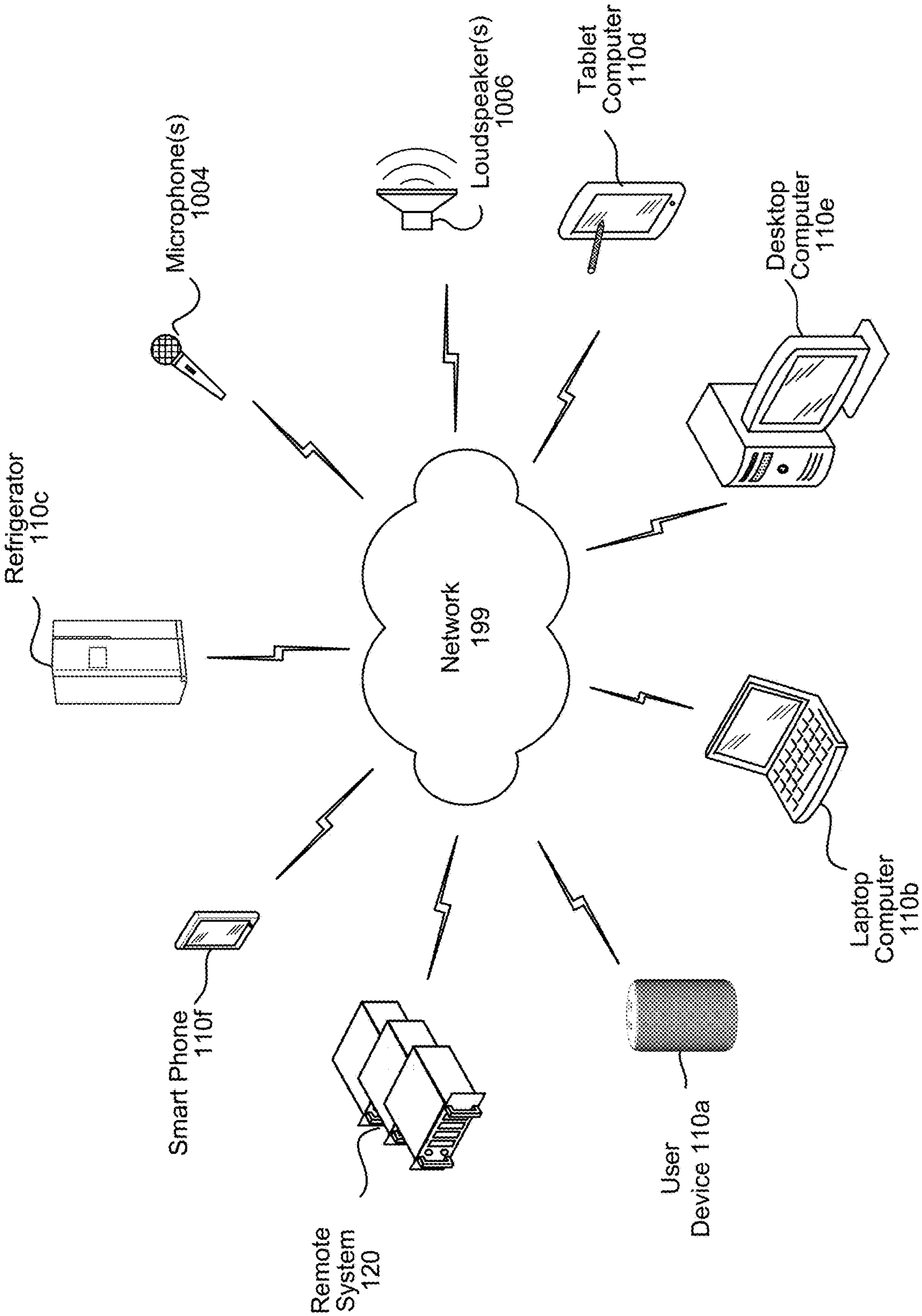
FIG. 10 illustrates a networked computing environment according to embodiments of the present disclosure.

FIG. 8 is a block diagram conceptually illustrating a user device 110. FIG. 9 is a block diagram conceptually illustrating example components of the remote system 120, which may be one or more servers and which may assist with voice-transfer processing, speech-synthesis processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (802/902). The device 110 may further include loudspeaker(s) 812, microphone(s) 820, display(s) 816, and/or camera(s) 818. The remote system 120 may similarly include antenna(s) 914, loudspeaker(s) 912, microphone(s) 920, display(s) 916, and/or camera(s) 918.

Computer instructions for operating each device/system (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device/system (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Referring to FIG. 8, the device 110 may include input/output device interfaces 802 that connect to a variety of components such as an audio output component (e.g., a microphone 820 and/or a loudspeaker 812), a wired headset, and/or a wireless headset (not illustrated), or other component capable of outputting audio. The device 110 may also include an audio capture component. The audio capture component may be, for example, the microphone 820 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical systems in a collection of systems or other components.

The components of the device(s) 110 and/or the system 120 may include their own dedicated processors, memory, and/or storage. Alternatively, one or more of the components of the device(s) 110 and/or the system 120 may utilize the I/O interfaces (802/902), processor(s) (804/904), memory (806/906), and/or storage (808/908) of the device(s) 110 and/or system 120.

As noted above, multiple devices may be employed in a single system. In such a multi-device system, each of the devices may include different components for performing different aspects of the system's processing. The multiple devices may include overlapping components. The components of the device 110 and/or the system 120, as described herein, are illustrative, and may be located as a stand-alone device or may be included, in whole or in part, as a component of a larger device or system.

The network 199 may further connect a voice-controlled user device 110*a*, a tablet computer 110*d*, a smart phone 110*f*, a refrigerator 110*c*, a desktop computer 110*e*, and/or a laptop computer 110*b* through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones and/or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented as in firmware or hardware, such as the acoustic front end, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

receiving a first user input corresponding to a characteristic of speech;

determining, using the first user input, first data representing the characteristic;

associating the first data with a user profile;

after associating the first data with the user profile, receiving a second user input associated with the user profile;

determining output data responsive to the second user input; and performing speech synthesis processing using the first data and the output data to determine synthesized speech data responsive to the second user input and corresponding to the characteristic.

2. The computer-implemented method of claim 1, wherein:

receiving the first user input comprises receiving the first user input from a first device; and receiving the second user input comprises receiving the second user input from a second device.

3. The computer-implemented method of claim 2, further comprising:

determining the second device is associated with the user profile.

4. The computer-implemented method of claim 1, further comprising:

determining the characteristic corresponds to a first application with respect to the user profile;

associating the first data with the first application; and determining the second user input corresponds to the first application, wherein performing the speech synthesis processing using the first data is based at least in part on the second user input and the first data corresponding to the first application.

5. The computer-implemented method of claim 1, further comprising:

determining the characteristic corresponds to a first application with respect to the user profile;

associating the first data with the first application;

receiving a third user input corresponding to a second characteristic of speech to be associated with a second application with respect to the user profile;

determining, using the third user input, second data representing the second characteristic; and associating the second data with the second application and with the user profile.

6. The computer-implemented method of claim 1, wherein the first user input was received from a first device and the method further comprises, after performing the speech synthesis processing:

receiving, from a second device, a third user input corresponding to a second characteristic of speech;

determining the second device is associated with the user profile;

determining modified first data representing the second characteristic; and storing second data associating the modified first data with the user profile.

7. The computer-implemented method of claim 1, wherein determining the first data comprises:

determining, using the first user input, a first value representing the characteristic; and determining, using the first value, encoded data representing the characteristic, wherein the first data comprises the encoded data.

8. The computer-implemented method of claim 7, wherein performing the speech synthesis processing comprises processing the encoded data using a neural network speech synthesis processing component to determine the synthesized speech data.

9. The computer-implemented method of claim 1, further comprising:

displaying, using a first device, a graphical user interface, wherein the first user input was received by the first device in response to display of the graphical user interface.

10. The computer-implemented method of claim 9, further comprising:

determining the first user input corresponds to manipulation of at least one element of the graphical user interface from a first position to a second position, wherein determining the first data is based at least in part on the manipulation.

11. A system comprising:

at least one processor; and at least one memory comprising instructions that, when executed by the at least one processor, cause the system to:

receive a first user input corresponding to a characteristic of speech;

determine, using the first user input, first data representing the characteristic;

associate the first data with a user profile;

after association of the first data with the user profile, receive a second user input associated with the user profile;

determine output data responsive to the second user input; and perform speech synthesis processing using the first data and the output data to determine synthesized speech data responsive to the second user input and corresponding to the characteristic.

12. The system of claim 11, wherein:

receive the first user input comprises receiving the first user input from a first device; and receive the second user input comprises receiving the second user input from a second device.

13. The system of claim 12, wherein the at least one memory further comprises instructions that, when executed by the at least one processor, further cause the system to:

determine the second device is associated with the user profile.

14. The system of claim 11, wherein the at least one memory further comprises instructions that, when executed by the at least one processor, further cause the system to:

determine the characteristic corresponds to a first application with respect to the user profile;

associate the first data with the first application; and determine the second user input corresponds to the first application, wherein performance of the speech synthesis processing using the first data is based at least in part on the second user input and the first data corresponding to the first application.

15. The system of claim 11, wherein the at least one memory further comprises instructions that, when executed by the at least one processor, further cause the system to:

determine the characteristic corresponds to a first application with respect to the user profile;

associate the first data with the first application;

receive a third user input corresponding to a second characteristic of speech to be associated with a second application with respect to the user profile;

determine, using the third user input, second data representing the second characteristic; and associate the second data with the second application and with the user profile.

16. The system of claim 11, wherein the first user input was received from a first device and wherein the at least one memory further comprises instructions that, when executed by the at least one processor, further cause the system to, after performance of the speech synthesis processing:

receive, from a second device, a third user input corresponding to a second characteristic of speech;

determine the second device is associated with the user profile;

determine modified first data representing the second characteristic; and store second data associating the modified first data with the user profile.

17. The system of claim 11, wherein the instructions that cause the system to determine the first data comprise instructions that, when executed by the at least one processor, cause the system to:

determine, using the first user input, a first value representing the characteristic; and determine, using the first value, encoded data representing the characteristic, wherein the first data comprises the encoded data.

18. The system of claim 17, wherein the instructions that cause the system to perform the speech synthesis processing comprise instructions that, when executed by the at least one processor, cause the system to process the encoded data using a neural network speech synthesis processing component to determine the synthesized speech data.

19. The system of claim 11, wherein the at least one memory further comprises instructions that, when executed by the at least one processor, further cause the system to:

display, using a first device, a graphical user interface, wherein the first user input was received by the first device in response to display of the graphical user interface.

20. The system of claim 19, wherein the at least one memory further comprises instructions that, when executed by the at least one processor, further cause the system to:

determine the first user input corresponds to manipulation of at least one element of the graphical user interface from a first position to a second position, wherein determination of the first data is based at least in part on the manipulation.

21. The computer-implemented method of claim 1, wherein the first data comprises encoded data representing the characteristic.

22. The computer-implemented method of claim 1, further comprising:

processing the first user input to determine a first value corresponding to the characteristic, wherein the first data includes the first value.

23. The system of claim 11, wherein the first data comprises encoded data representing the characteristic.

24. The system of claim 11, wherein the at least one memory further comprises instructions that, when executed by the at least one processor, further cause the system to:

process the first user input to determine a first value corresponding to the characteristic, wherein the first data includes the first value.

* * * * *